106. COMPOSITIONS, COATING OR PLASTIC.

77

Cross Reference

UNITED STATES PATENT OFFICE.

506,870

PHILIP CAREY, OF CINCINNATI, OHIO.

MANUFACTURE OF FIREPROOF COVERINGS FOR STEAM-PIPES.

SPECIFICATION forming part of Letters Patent No. 506,870, dated October 17, 1893.

Application filed August 20, 1891. Renewed October 8, 1892. Serial No. 448,176. (No specimens.)

*To all whom it may concern:*

Be it known that I, PHILIP CAREY, a citizen of the United States, residing at Cincinnati, in the county of Hamilton and State of Ohio, have invented a certain new and useful Process for the Manufacture of Fireproof Coverings for Steam-Pipes, Boilers, Builders' Purposes, and the Like, of which the following is a full, clear, and exact description.

My improvements relate to an improved method of forming fire proof coverings and they consist in my novel method of treating the material in the process of manufacture whereby a fire proof covering of extreme lightness and excellent non-conducting qualities yet of great strength and durability is obtained.

It has been for a long time common to manufacture fire proof covering from asbestus fiber, magnesia and the like mixed with various ingredients, such as cement, plaster of paris, soluble glass and the like to give the whole mass strength, and durability, but in these coverings strength and durability are obtained at the expense of lightness and elasticity. Soluble glass when employed in this connection is used to bind the parts together and render them fire proof and its effect especially when used in connection with plaster of paris and cements is to greatly retard the setting of the mass in the molds and render the product heavy and inelastic. While I employ these well known ingredients in my composition, I combine and unite them in such a way that a covering of great lightness, porosity and elasticity is produced, as well as of exceeding strength and durability, and it is in this method of treatment that the essentials of my invention lie, as will be hereinafter more particularly pointed out and claimed.

In my improved process I take asbestus fiber, to which I add when desired, although they are not necessary or essential elements of my composition, magnesia, chalk or the like and mix the same thoroughly with plaster of paris or other suitable binding material in a dry state, the proportions of the ingredients being preferably one-third asbestus or the like, to two thirds of plaster of paris or other suitable binding material. This mixing in the dry state is done in any suitable machine where the entire mass may be thoroughly and mechanically mixed. After the ingredients are thus mixed in the dry state, water is added in such quantities as to convert the mass into a thick paste. But water alone is not sufficient to produce the best results, so that to the water before it is mixed with the dry mass, about six per cent. of sulphate of soda or Glauber's salt is added. The effect of this is to make the paste set with extreme rapidity when poured into the molds and a very light porous and elastic product is the result. As ordinarily made with water alone these results cannot be obtained, as the product, setting more slowly as it does, is very apt to become heavy and soggy. This quick setting of the mass is a very essential part of the process, as it renders the product very porous and consequently very light, and this porosity makes the covering also an extremely good non-conductor of heat. This porosity and consequent excellent non-conductivity of the material is due to this quick setting of the material and as a result of the ingredients used. The object in thus mixing the ingredients in a dry state, is to thoroughly disintegrate the fibrous material to be mixed with the plaster of paris, because as soon as the water is added to the dry mass in connection with the Glauber's salt, the product must be handled very quickly, and if the material were mixed with the water at the start, it would be impossible to properly co-mingle the plaster and fibrous material, and the result would be the product would be soggy and heavy in part, so that the order in which the ingredients are put together, is an essential part of the process. The conversion of the dry mass into a paste it will be readily understood cannot be accomplished in as large quantities as the first mixing of the ingredients, and therefore the paste must be formed a little at a time in a much smaller machine. The paste is then poured into molds to form the desired shape of the covering, these shapes varying in accordance with the different uses to which the covering is to be put, whether for pipes, boilers, blocks or fittings, and the like. After standing a sufficient time to become hard, the section is removed from the molds, placed in a dry room and allowed to become thoroughly dry. After the sections are then cut to the proper length, they are dipped for a moment or two and completely submerged in a tank containing soluble glass. The soluble glass is not mixed with the ingredients as has ordinarily been done, which as before stated would render the mass inert and heavy but a section of the covering is first formed and then dipped only for a very short time in the soluble glass. The purpose of this is to fill up the outer pores of the covering thus forming as it were, a dead air chamber, and at the same time giving the necessary strength. Without this soluble glass the covering would not be thoroughly practicable to handle and liable to disintegrate on exposure to the atmosphere. The soluble glass so fills up the outer pores of the covering as to prevent this disintegration and to give a hard and firm surface to the material. While I am aware that it is old to employ these ingredients and to employ them in connection with soluble glass, this manner of treatment I believe to be new. The saturation with soluble glass after the covering is formed in the manner described, produces a new product free from many of the imperfections of previous fire proof covering.

When the sections formed in the molds are intended for block coverings and the like in which comparatively long strips of covering are used in order to hold the mass thoroughly together, I insert in the molds strips of lathing or other suitable material around which the covering is formed leaving the laths embodied therein. The sections of the covering having thus been formed and saturated with soluble glass are then allowed to dry for a second time, when they are preferably wrapped with a layer of paper and a layer of canvas on the outside. For pipe coverings the sections are then cut lengthwise in order to conveniently fit around the pipes.

Having thus described my invention, what I claim, and desire to secure by Letters Patent is—

1. A composition of matter for boiler coverings, composed of asbestus fiber, plaster of paris and soluble glass, substantially in the manner and for the purpose described.

2. A new process for forming fire proof coverings, consisting in first thoroughly mixing asbestus fiber and plaster of paris in a dry state, then mixing with water, molding and drying same, and then saturating with soluble glass, substantially in the manner and for the purpose described.

3. A new process for forming fire proof coverings, consisting in first thoroughly mixing asbestus fiber and plaster of parts in a dry state, then mixing with water and Glauber's salt in substantially the proportions described, molding and drying same, and then saturating with soluble glass, substantially in the manner and for the purpose described.

PHILIP CAREY.

Witnesses:
BERNARD HERBERS,
GEORGE HEIDMAR.